United States Patent [19]

Ugolini

[11] Patent Number: 4,900,158

[45] Date of Patent: Feb. 13, 1990

[54] GRANITA PRODUCTION MACHINE

[75] Inventor: Giancarlo Ugolini, Milan, Italy

[73] Assignee: Ugolini S.P.A., Milan, Italy

[21] Appl. No.: 364,842

[22] Filed: Jun. 12, 1989

[30] Foreign Application Priority Data

Jun. 24, 1988 [IT] Italy .............................. 21100 A/88

[51] Int. Cl.[4] .......................... B01F 7/08; B01F 15/06; A23G 9/12

[52] U.S. Cl. ....................................... 366/143; 62/343; 366/144; 366/266; 366/295; 366/296; 366/320; 366/331

[58] Field of Search ............... 366/143, 144, 145, 147, 366/149, 192, 193, 196, 197, 206, 246, 266, 293, 294, 295, 296, 318, 319, 320, 343, 331, 601; 62/342, 343; 99/455

[56] References Cited

U.S. PATENT DOCUMENTS

| | | | |
|---|---|---|---|
| 490,475 | 1/1893 | Holden | 62/342 X |
| 808,319 | 12/1905 | Valerius | 366/149 X |
| 824,075 | 6/1906 | Gerner | 62/343 X |
| 1,512,665 | 10/1924 | Bagby | 366/246 X |
| 2,064,131 | 12/1936 | Tuscan et al. | 366/149 |
| 2,367,149 | 1/1945 | Smith | 366/144 |
| 2,758,823 | 8/1956 | Vasby | 366/318 |
| 3,159,007 | 12/1964 | Rahauser et al. | 366/149 X |
| 3,188,826 | 6/1965 | Carpigiani | 62/342 X |
| 4,364,666 | 12/1982 | Keyes | 62/342 X |

*Primary Examiner*—Harvey C. Hornsby
*Assistant Examiner*—Scott J. Haugland
*Attorney, Agent, or Firm*—Shlesinger, Fitzsimmons & Shlesinger

[57] ABSTRACT

A machine for the production of granita and in particular of the type called Sicilian granita comprising a container with a predominately horizontal development in which rotate motorized means for stirring the mixture contained therein in contact with a wall chilled by a refrigerating circuit and means of delivery of said mixture from said container. Said chilled wall is cylindrical in form and said means of stirring the mixture comprise a first rotating cylindrical screw propeller placed inside and axially with said cylinder and a second rotating cylindrical screw propeller placed axially with and wound externally around said cylinder, said screw propellers being rotated by a motor to impart opposed thrusts to the mixture so as to bring about circulation of the liquid in one direction inside the cylinder and the opposite direction outside thereof.

The mixture container is accomplished in a single piece preferably of transparent material and completely removable from the machine to facilitate cleaning.

11 Claims, 2 Drawing Sheets

GRANITA PRODUCTION MACHINE

DESCRIPTION

Machines for the production of granita, in particular the so-called "Sicilian granita", wherein formation of ice in the acqueous solution and maintenance thereof in a pasty consistency is secured through the combined action of a refrigerating circuit and a rotating agitator immersed in the mixture.

Such machines exist at present in two main types, to wit with the tank and its agitator developing vertically or horizontally.

The invention relates more specifically to this second type of machine, which prepares a high-quality granita and delivers it under thrust to one end of the horizontal tank where an outlet with a tap is provided.

A known form of embodiment of granita machines provides an essentially cylindrical chamber, the wall of which is entirely metal, in contact with the evaporator of a refrigerator circuit. In this embodiment the heat exchange surface is very large with the resulting benefits for the capacity of the machine regarding the quantity of granita produced.

However this type of machine does not allow ready cleaning of the chamber, which is necessarily fixed and accessible only by removal of the front wall. In addition it is impossible to see the contents, i.e. the granita in the course of preparation, as would be desirable to attract consumers.

To allow in particular placing in view the horizontal tank in which the granita is prepared, there has been proposed the formation thereof in two parts, to wit a lower metallic part for heat exchange and an upper part of transparent material. In this embodiment the upper part is removable to provide access to the agitator and permit cleaning of the tank by an operation which is not, however, quite easy. Reduction of the area of the exchange wall lowers the efficiency of the machine and the visibility of the contents is also limited.

The object of the present invention is to obviate the drawbacks of the known art, in particular providing a machine with high surface area for heat exchange while the granita is forming and with complete visibility of the mixing chamber and complete and easy cleaning of the parts in contact with the foodstuff.

In view of these objects it was thought to realize a granita production machine, in particular of the type of granita called "Sicilian granita", comprising a container in which rotate motorized means for stirring of the liquid mixture contained therein in contact with a wall chilled by a refrigerator circuit and mean$ of delivering said mixture from said container characterized in that said chilled wall has a cylindrical form and that said stirring means of the mixture consist of a first rotating cylindrical screw propeller placed inside said cylinder and axially therewith and a second cylindrical screw propeller rotating axially therewith and coiling around said cylinder externally, the screw propellers being rotated by a motor to impart opposed thrusts to the mixture.

Figure 1:
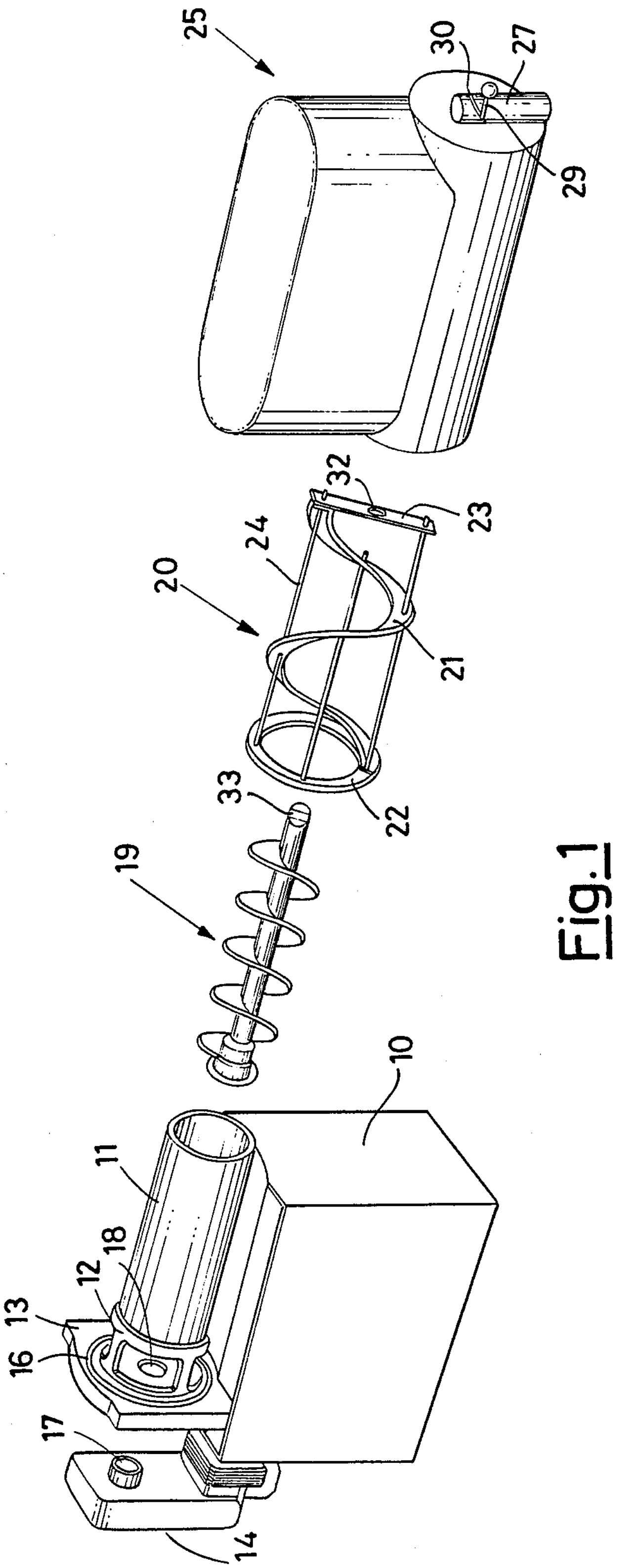
Figure 2:
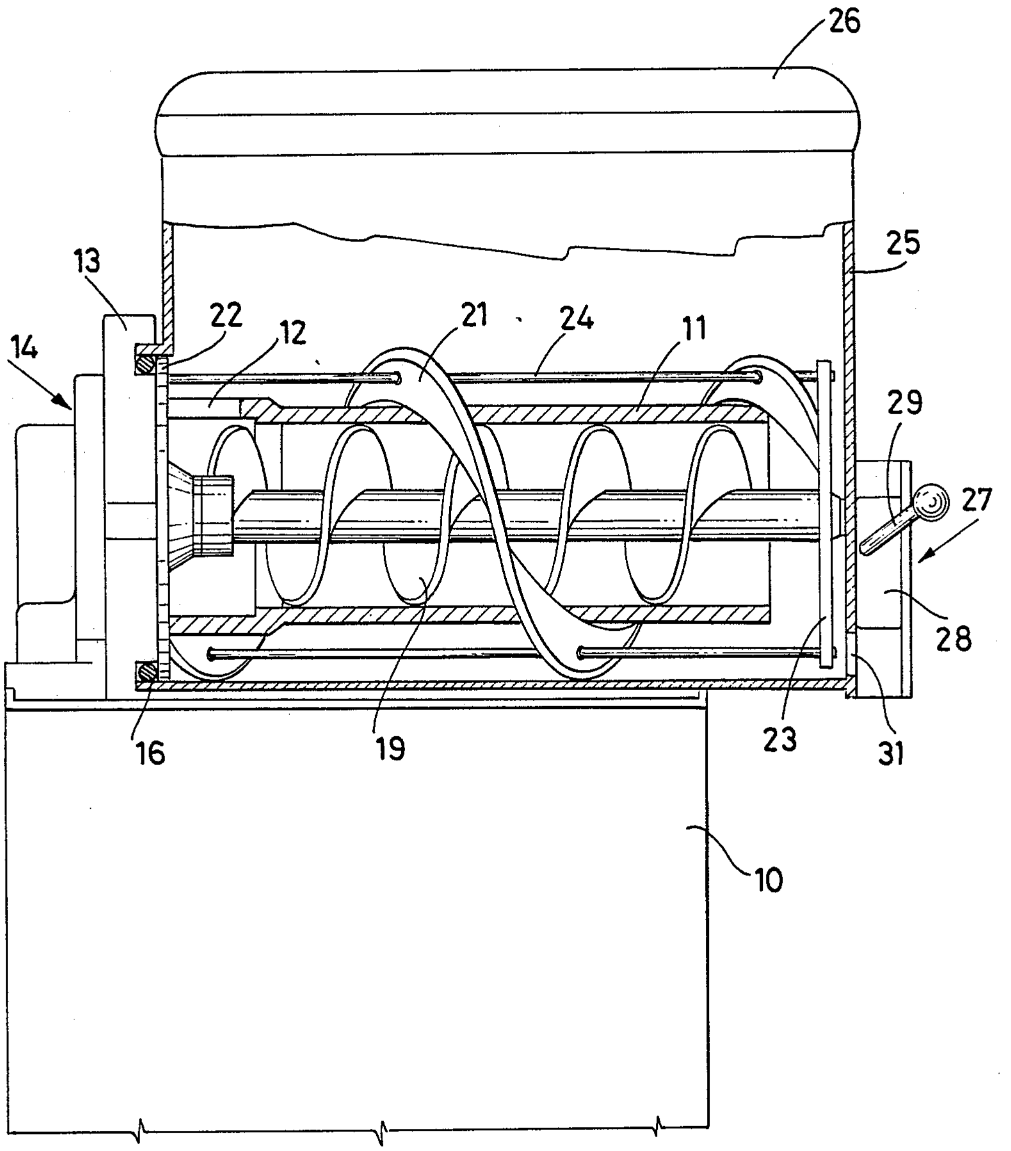

To explain more clearly the innovative principles of the present invention and its advantages compared with the known art there is described below with reference to the annexed drawings a possible embodiment as an example of an application of said principles. In the drawings FIG. 1 shows an exploded schematic perspective view of a granita production machine accomplished in accordance with the innovative principles of the present invention, and FIG. 2 shows a partial cross section of a side elevation of the machine shown in FIG. 1.

With reference to the figures a granita production machine comprises a base 10 containing the electric circuits for control of the machine and a refrigerating device of the known art the evaporator of which is accomplished in the form of a hollow cylinder 11 fixed in a projecting manner by means of a hollow support 12 having openings to a vertical body 13 projecting from the upper part of the base 10 in such a manner that said cylinder is horizontal and extends along the upper surface of the base 10.

The refrigerating circuit with all the control devices connected therewith and the entire electrical part of the machine, which can be of any type in the known art, will not be further described herein as they are easy to immagine by those skilled in the art.

The connections between the evaporator in the cylinder 11 and the rest of the refrigerating circuit pass within the support 12 and the body 13.

An electric ratiomotor unit 14 is connected to the body 13 in such a manner that the output shaft 17 is axial with the axis of the cylinder 11 and passes in a sealed manner through a hole 18.

To the output shaft 17 is connected in a removable manner a cylindrical screw propeller 19 with its axis parallel to the axis of the cylinder and diameter slightly smaller than said cylinder.

To protect the motor against excessive loads in case the mixture becomes too dense, there can be placed, as is known to those skilled in the art, a torque limiter, e.g. the friction type between the screw propellers and the geared motor, or consisting of a current limiting device of known type in the motor.

A second cylindrical screw propeller 20 consisting of a strip arranged helically 21 with winding direction opposite that of the screw propeller 19, can be advantageously supported and held in shape by a frame consisting of a ring 22 and a crosspiece 23 connected together and to the screw propeller by rods 24.

The crosspiece 23 has a central hole 32 for engagement in a removable manner on the appropriately shaped free end 33 of the central shaft of the screw propeller 19 in such a manner as to form a rigid assembly therewith upon engagement.

As can be seen in FIG. 2 once assembled the components described above form a structure in which the screw propeller 19 is completely inserted in the cylinder 11 so as to graze the inner wall thereof while the screw propeller 20 is arranged around the cylinder so as to graze the outer wall thereof.

A container 25 made of transparent material and having low heat conduction (e.g. plastic) consisting of a cylindrical section from which there extends in the upward part an extension open at the top and optionally equipped with a removable cover 26 is fitted on the assembly consisting of the cylinder 11 and the screw propellers 19, 20 in such a manner as to receive it, through a side opening 15, in the cylindrical section which has an internal diameter slightly larger than the outside diameter of the second screw propeller 21 and a length such that, when the container 25 is secured and sealed to the body 13 (by means of any system of the known art, with screws, fixed end etc. and therefore not shown in detail) the assembly formed by the two screw propellers grazes the opposite end of the container.

As may be seen in FIG. 2, once the container is fixed, the screw propeller grazes the internal cylindrical walls thereof.

A gasket 16 placed in a seat corresponding with the edge of the opening 15 of the container ensures sealing of the connection between the container 25 and the body 13.

The container 25 bears on the end of the cylindrical section opposite the opening for insertion of the agitator-refrigerator unit a delivery tap 27 which can be of any known type in the known art. For example a sliding cylinder 28 moved by means of a lever 29 moving in an inclined slot 30 in such a manner as to open or close a hole 31 in the wall of the container 25 placed level with the lower part of the external screw propeller.

The machine operates as follows.

With the container installed on the machine and the mixture to be converted to granita placed therein, when the machine starts the refrigerator will begin to chill the mixture by means of the evaporator cylinder 11 while the ratiomotor 14 will put in motion the screw propeller 19 which will transmit the motion of the outer screw propeller 20 integral therewith.

The two screw propellers being wound in opposite directions, within the cylinder the mixture will move in one direction while externally it will move in the opposite direction, giving rise to a continuous stirring of the mixture and reaching all points thereof.

The direction of rotation of the screw propellers is preferably the direction which brings about a movement of the mixture from left to right (seen from the machhine in FIG. 2) to the outside of the cylinder 11 and vice versa inside, in such a manner as to aid flow of the mixture through the hole 31 upon opening of the tap 27.

The action of the two screw propellers along the walls of the cylinder 11 also prevents formation of ice thereon so as to not limit the chilling action and prevent blockage of the screw propellers.

It is noted that said chilling action is particularly effective because the contact surface between the evaporator and the mixture is much larger than that of a machine of the same container size but accomplished according to the known art, especially the types where only the lower wall of the mixture container effects the heat exchange, being in contact externally with the evaporator of the refrigerating circuit.

Finally the possibility of completely separating the container from the rest of the machine and of removing the screw propellers from the cylinder 11 permits very thorough cleaning of all the parts in contact with the mixture.

The general form of the machine and in particular of the container 25 and the base 10 is shown here only as an example as is the form of embodiment of the screw propeller 20 and the support 12 and should not be considered limiting within the scope of the present invention.

However rational the use of a direct coupling of the screw propeller 19 with the screw propeller 20 may be and hence producing opposite flow of the mixture by means of opposite winding directions of the two screw propellers, it is of course possible to accomplish a machine applying the innovative principles of the present invention having screw propellers wound in the same direction but counter-rotated by using appropriate motors easy to immagine for anyone skilled in the art.

I claim:

1. A machine for the production of granita and in particular of the type called Sicilian granita comprising a container with a predominately horizontal development in which rotate motorized means for stirring the mixture contained therein in contact with a wall chilled by a refrigerating circuit and means of delivering said mixture from said container characterized in that said chilled wall is cylindrical in form and that said stirring means for the mixture comprise a first rotating cylindrical screw propeller placed inside and axially with said chilled wall and a second rotating cylindrical screw propeller placed axially with and wound externally to said chilled wall, said screw propellers being rotated by a motor to impart opposed thrusts to the mixture.

2. A machine in accordance with claim 1 characterized in that said container is made of transparent material having low heat conductivity and in particular plastic.

3. A machine in accordance with claim 1 characterized in that said screw propellers are connected together and moved by a single electric ratiomotor constituting said motor with concordant rotation direction and opposite winding directions of the screw propellers.

4. A machine in accordance with claim 1 characterized in that said machine has a vertical body to which the cylindrical chilled wall is fixed in a projecting manner through a hollow support having openings for circulation of the mixture inside the wall and traversed by the drive shaft of the first screw propeller.

5. A machine in accordance with claim 4 characterized in that said container has a lower part which constitutes a chamber enveloping the second screw propeller in its lower part and at one end has an opening through which penetrates the projecting chilled wall in which is arranged the first screw propeller to bring the opening into sealed contact with a seat corresponding with said vertical body of the machine.

6. A machine in accordance with claim 5 characterized in that the container has a controlled delivery passage arranged opposite that of said opening.

7. A machine in accordance with claim 4 characterized in that said first screw propeller has an extension outside the projecting end of the cylindrical chilled wall to be connected to the second screw propeller.

8. A machine in accordance with claim 7 characterized in that the second screw propeller has at one end an annular support resting on the cylindrical chilled wall and at the other end a coupling element for coupling to the extension of the first screw propeller.

9. A machine in accordance with claim 1 characterized in that the motor has a device limiting the driving torque transmitted to the screw propellers.

10. A machine in accordance with claim 9 characterized in that said limiting device consists of a friction mechanism.

11. A machine in accordance with claim 9 characterized in that said limiting device consists of a device limiting the current absorbed by the motor.

* * * * *